July 18, 1967
A. J. DANIELSON ET AL
3,331,729
ADHESIVE BONDING METHOD AND PRODUCT
Filed Feb. 14, 1963
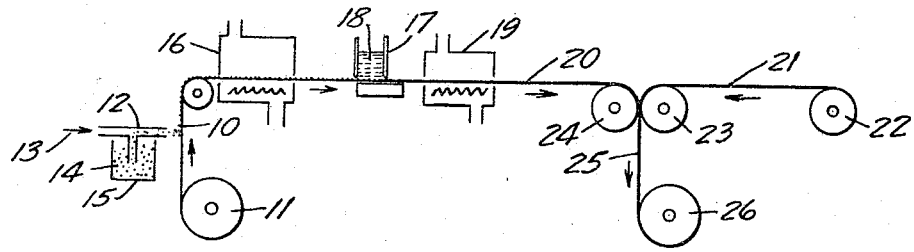
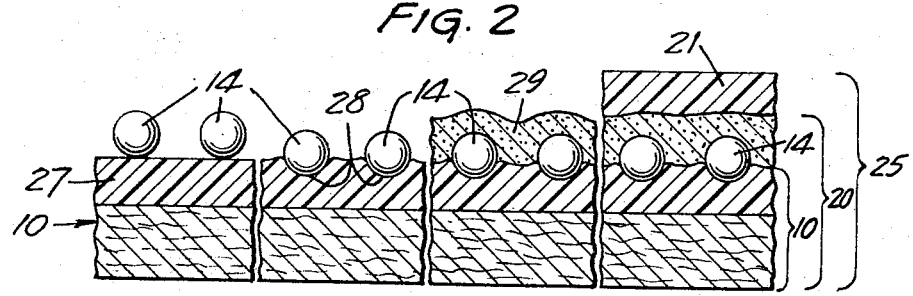
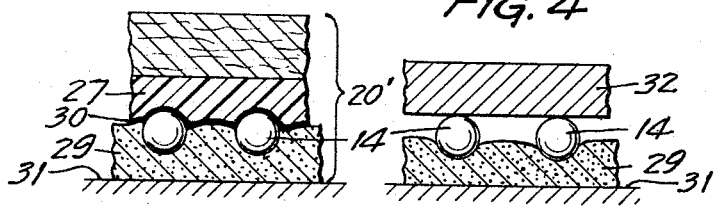
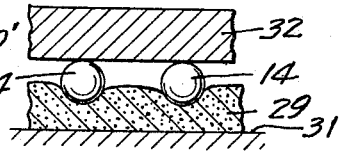
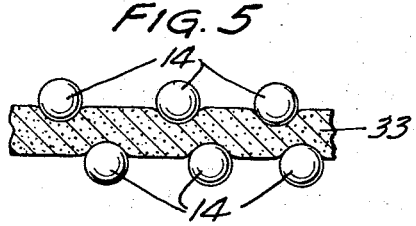
INVENTORS
ALTON J. DANIELSON
HAROLD A. BERG
BY
Carpenter, Abbott, Coulter & Kinney
ATTORNEYS

United States Patent Office 3,331,729
Patented July 18, 1967

3,331,729
ADHESIVE BONDING METHOD AND PRODUCT
Alton J. Danielson, Stillwater, and Harold A. Berg, North St. Paul, Minn., assignors to Minnesota Mining and Manufacturing Company, St. Paul, Minn., a corporation of Delaware
Filed Feb. 14, 1963, Ser. No. 258,487
14 Claims. (Cl. 161—162)

This invention relates to articles, particularly sheet materials, made from or coated with adhesives, and to methods of making and using the same; and is particularly, although not exclusively, concerned with adhesive films and coatings wherein the adhesive material is normally tacky and pressure-sensitive.

Pressure-sensitive adhesives as employed on masking tape products and the like are characterized by a "quick-grab" property which permits the tape to adhere on mere contact with adhesive-receptive surfaces to which applied. Once the adhesive tape or sheet contacts the surface it can no longer be moved about without being first stripped from the surface. The application of pressure-sensitive adhesive sheet materials in larger sections to specific surface areas is thereby made unduly difficult. The problem is still more severe where the pressure-sensitive adhesive forms a strong permanent bond with the surface, or where the carrier sheet is easily wrinkled or torn or otherwise distorted.

As an example of the difficulties involved, large sheets of figured or patterned paper or fabric wall-coverings coated with pressure-sensitive adhesive have heretofore been virtually impossible to apply because of the difficulty of matching the pattern while preventing the coated surface from becoming tightly bonded to the wall, and the tendency of the adhesive surface to cohere permanently to itself when once placed in contact. The difficulty has previously been overcome primarily by providing the coated sheet with a removable cover-sheet or liner which may be progressively stripped from the adhesive surface just prior to pressing the latter against the wall. The tension required to remove the liner frequently causes dislocation or wrinkling of previously applied areas, or distortion of the coated covering. Wall coverings accordingly have not ordinarily been bonded in place with pressure-sensitive adhesives.

Even with coverings of much smaller areas, much difficulty has been encountered where extremely accurate positioning or registering of the adhesive-coated covering is required. The locating on a flat sheet-metal base of numbers of small oddly shaped segments of differently colored plastic films or beaded reflex-reflective sheet materials in close-fitting patterns is often required in the manufacture of sign-boards and markers. Precise placing of the segments is difficult when they are adherent on contact. Coating the base surface with a liquid adhesive which for a time permits removal and relocation of the segments has not been found fully effective since the adhesive contains volatile solvents which must first be removed and the dried layer soon cures to a state in which it no longer forms an adherent bond to the film or sheet.

Medallions, labels, face-plates, printed circuit components and other attachments are frequently desired on metal or other substrates. Adhesives containing volatile solvents or vehicles in many instances cannot be used for such purposes because of the difficulty of removing the solvent after the vapor-impermeable covering is in place. Coatings of normally non-tacky heat-activatable adhesives or of fusible solder or other metallic bonding agents permit precise positioning of the coated coverings but are not satisfactory on bulky metal substrates having high heat capacity or on substrates which are not sufficiently heat-resistant. Pressure-sensitive adhesives, even though providing ample bonding power and ease of application, have not heretofore been found desirable for these applications because of their "quick-grab" properties which prevent re-positioning of the member when once tentatively applied.

The present invention overcomes these and other deficiencies and disadvantages. In a preferred form of the invention there is provided an adhesive coating which is pressure-sensitive and capable of forming a strong adhesive bond with a substrate surface on being pressed thereagainst under moderate hand pressure, but which on light contact with said surface remains unbonded thereto and which may therefore be moved around over the surface and slid into position as desired. Neither drying nor heating of the assembly is required. A firm bond is attained directly, and merely by localized application of pressure.

The invention also provides a method of making these adhesive-coated sheet materials in a form in which the coating is effectively protected from pressure-activation even against severe localized application of pressure.

These and other unique and advantageous properties and results are obtained by supplying over the adhesive coating a sparse uniform distribution of very small hollow thin-walled fragile microspheroids or "microballoons," preferably embedded somewhat beyond their centers in the adhesive layer and protected from premature collapse by a close-fitting removable protective covering, all as will be hereinafter described and illustrated.

In the drawing,

FIGURE 1 is a schematic representation outlining a presently preferred method and apparatus for making the adhesive sheet material, and FIGURE 2 represents in cross-section the several stages in the manufacture of the adhesive sheet material by the method and apparatus of FIGURE 1;

FIGURES 3 and 4 show a cross-sectional view of a protected adhesive film as applied and put to use on a rigid substrate; and FIGURE 5 illustrates a doubly protected adhesive film also in cross-section.

In FIGURE 1, a web of thermoplastic polymer coated paper 10 from a supply roll 11 is first drawn past a source of thin-walled hollow fragile small spheroidal particles. An aspirator 12 supplied with compressed air as indicated by the arrow 13 and with microballoons 14 from container 15 provides a convenient source. The web in horizontal position is heated in an oven 16, and is then drawn beneath a coating hopper or spreader bar 17 where it is evenly coated with a solution of pressure-sensitive adhesive 18. The coated web next passes through an oven 19 for removal of solvent, the dried product being indicated at 20. A protective and decorative film or web 21, for example a pigmented plastic film, from supply roll 22 is united with the dry adhesive surface by pressure applied between squeeze rolls 23 and 24. The completed sheet product 25 is then wound up into storage roll 16 for subsequent conversion to sizes and shapes as desired.

The several stages of manufacture are illustrated in FIGURE 2. The first stage illustrates the microballoons 14 held by electrostatic attraction to the flat smooth surface of the polymeric coating 27 of the web 10. In the second stage the microballoons have penetrated, desirably for about one-fourth to about one-third of their diameter, into the heat-softened coating, the latter being displaced thereby to provide corresponding rounded socket-like depressions 28. The dried pressure-sensitive adhesive coating 29 added at stage 3 has a gently globuliferous or pebbled surface appearance. The application in stage 4 of the plastic film 21 under pressure partially flattens the adhesive protuberances and provides a strong adherent bond between the adhesive surface and the surface of the plastic film, but does not flatten or shatter the microballoons 14 in their close-fitting sockets.

In a specific illustrative example the web 10 consists of 70-lb. kraft paper (per ream of 3000 sq. ft.) smoothly and uniformly coated with 18 lbs. per ream of polyethylene.

The walls or shells of the hollow thin-walled fragile microspheroids are composed of urea-formaldehyde resin and the screen size is defined as "through 140 mesh, on 270 mesh." Thus the particles have an average diameter of between about 55 and about 105 microns. For an illustrative preparation of such hollow particles, reference is made to Veatch et al. U.S. Patent No. 2,797,201.

The hollow particles are applied as uniformly as possible over the surface of the polyethylene coating at a rate of approximately one-half lb. per thousand square yards, which is about one-third the amount needed to provide a compact monolayer. The electrostatic charges produced are sufficient to adhere the dry particles to the plastic surface and to maintain good particle distribution.

The web is heated for about 30–45 seconds at 275° F. in the horizontal position, during which time the polyethylene softens and the particles sink into the plastic layer. Heating conditions are controlled so that the particles penetrate the plastic to about one-fourth to one-third of their diameter and without damage to the particles. The web is then cooled.

A coating of pressure-sensitive adhesive composition is next applied, the spreader bar being set at ten mils above the exposed tips of the partially embedded microballoons. The composition, as described in Ulrich Reissue Patent No. 24,906, consists of a copolymer of 95 parts of fusel oil acrylate and 5 parts of acrylic acid, in solution in a mixture of ethyl acetate and heptane at a coatable viscosity and at a concentration of about 20–25 percent. The coating is dried by heating at 150° F. for approximately ten minutes, forming a pebbly surface which adheres well to a variety of surfaces on contact.

A plastic decorative and protective film is separately produced by calendering to a thickness of four mils a pre-milled composition containing essentially 500 parts by weight of "VYNW" vinyl chloride-vinyl acetate copolymer, 100 parts of "Paraplex G–40" polymeric plasticizer, 75 parts of dioctyl phthalate, and 100 parts of titanium dioxide pigment, together with small amounts of stabilizers and lubricants where desired. As described in Oace et al. Reissue Patent No. 23,843, such films are characterized as being capable of remaining in stable equilibrium with rubber-resin type pressure-sensitive adhesives applied thereto. The smooth shiny white film is combined with the adhesive-coated web by pressing between rubber-covered roller 23 and steel roller 24, the pressure being sufficient to at least partially smooth out the adhesive layer and to form a firm bond with the vinyl film but insufficient to cause disruption of the hollow particles 14. Where desired, the film may first be provided with a thin coating of an adhesive primer composition for improving the bond with the pressure-sensitive adhesive.

The product can now be wound into rolls, or cut into sheets and stacked for storage and shipment. The handling and pressing incident to these operations does not flatten or fracture the microballoons, due to the presence of the close-fittting polymeric protective layer which equalizes the forces over the entire surface.

When it is desired to apply the adherent protective film to a substrate surface, for example a section of wall or of metal signboard, the film and protective carrier are first stripped apart. The polyethylene readily releases the adhesive and the microballoons, so that the film 21 is not stretched or pulled out of shape and the protruding portions of the hollow particles provide spacing means for holding the adhesive slightly away from the substrate surface. The film is placed lightly on the surface and gently slid into the exact position desired, the microballoons continuing to support the film and to prevent its adhesion to the substrate. When the desired placement has been achieved, the film is pressed into adhesive contact by localized pressure applied with a small hard roller, such as the wooden roller used by paper-hangers, or with the fingertips, or by forcefully drawing a blunt-edged scraper bar across the film surface. Under the pressure applied, the hollow particles collapse, permitting the adjoining adhesive surfaces to contact and adhere to the surface of the substrate.

The residual shells of the collapsed particles remain in the adhesive layer and reduce the force of adhesion between the adhesive-coated film and the substrate, as measured by the stripping force necessary to separate the two, by an amount closely proportional to the area of the adhesive surface occupied by the microballoons. As an example, a one inch wide strip of the coated film prepared as described above and applied to a clean smooth aluminum plate required a force of 4.5 lbs. for removal by stripping back over itself at a standard speed of 12 inches per minute. A strip otherwise identical but containing no microballoons exhibited a removal effort of 5.5 lbs. In the first sample, the particles were present to the extent of about one-third the concentration required for close packing, and therefore covered approximately one-fifth to one-fourth of the total surface.

An impressive demonstration of the effectiveness of the principles just illustrated may be made with an adhesive-coated sheet material prepared in the same manner with the single exception that the outer heavy vinyl film is replaced with a thin and easily torn film or treated paper. The resulting sheet is stripped from the supporting liner and placed, adhesive side down, on a flat clean metal panel, where it is easily slid about by pulling on the edges. A central strip is then pressed firmly against the panel by drawing a finger-tip along the upper surface under firm pressure. The edge of the sheet is then lifted and an attempt made to remove the sheet by lifting or stripping. The pressed area remains firmly bonded to the metal. The remainder is not adhered to the metal and is easily torn away and removed.

Although the polyethylene-coated paper protective liner is removable from the adhesive surface by hand stripping, the force necessary for the removal may be found to be undesirably high, particularly where larger areas are concerned. This difficulty may be avoided by applying over the flamed or otherwise suitably treated polyethylene surface a very thin well-bonded coating of a release agent or low-adhesion backsize. A surface coating of "DC–23" or other methylsilicone polymer release agent is exemplary, such a layer being shown at 30 in FIGURE 3 as applied to the surface of the polymeric coating 27. The silicone composition is conveniently applied from solution and cured by preliminary heating. The amount employed is sufficient to permit easy removal of the subsequently applied adhesive but is so slight as to have no apparent effect on the partial penetration of the spheroids into the softened plastic surface layer.

The procedure employed in the preceding example and illustrated in FIGURE 1 is particularly useful with such easily collapsed fragile microballoons as the urea-formaldehyde resin capsules there described, and may also be used with less fragile microballoons. A somewhat modified process, which is preferred with the latter class of spheroids, involves coating and drying the pressure-sensitive adhesive directly on the plastic film or other permanent backing and then simultaneously embedding the hollow particles partly within the dry adhesive layer and partly within the plastic release layer of the removable liner. The spheroids are conveniently applied to either the liner or the adhesive surface by spray application as a slurry in water, the water being substantially completely evaporated during the spray process. The liner is passed over a heated drum, where the plastic layer is softened sufficiently to permit the desired depth of penetration of the spheroids; and the adhesive-coated film, also at elevated temperature, is pressed against the plastic surface with the layer of particles between.

With some film materials it is not possible on a commercial basis to apply the liquid adhesive composition directly to the plastic film. The following example therefore illustrates a further modification in which the adhesive is first dried separately and is subsequently applied to the film, after which the hollow microspheres are placed on the adhesive surface and the sheet pressed against the plastic surfaced liner.

A temporary carrier web of heavy kraft paper having on one surface a smooth layer of polyethylene and sized with a cured polymethylsilicone release coat is coated with an adhesive composition, the formula being as follows:

| | |
|---|---|
| Acrylate copolymer | 566 |
| Phenol-aldehyde resin | 141 |
| Salicylic acid | 28 |
| Zinc resinate ("Zirex") | 85 |
| Heptane | 6690 |
| Alcohol | 226 |

The acrylate copolymer is a copolymer of three parts by weight of 2-ethylbutyl acrylate and one part of ethyl acrylate. The phenolic resin is a heat-advancing resin which is compatible with the copolymer.

The adhesive is dried at 150° F., the dry coating weighing 5–6 grains per 24 sq. in. A 4-mil vinyl resin film as hereinbefore described is combined with the adhesive coating under squeeze-roll pressure. The carrier web is stripped away. Small fragile hollow glass spheroids are formed into a slurry in about eight times their weight of water and the slurry is sprayed onto the adhesive surface. Essentially all of the water evaporates during the coating procedure. About one-fourth to one-third of the surface is covered with the spheroids. The carrier is then passed over a steam-heated roller where it is heated to approximately 270° F., at which point the spheroid-coated adhesive film is returned into pressure contact with the softened plastic release layer. The pressure, applied with a rubber-covered roller having a Shore durometer hardness reading of about 60, is maintained at approximately one pound per inch of width. The spheroids become embedded to approximately an equal depth in the plastic layer and in the adhesive layer. The product is then cooled and wound up in roll form.

Thin-walled hollow small glass spheres or spheroids represent a class of microballoons which have sufficient strength and rigidity to withstand the moderate pressures applied through the heat-softened liner and adhesive layers in the modified process just described while still being sufficiently fragile to be collapsed under application pressures applied to the unprotected exposed particle surfaces. The fragility of such particles may be controlled by controlling the thickness or composition of the shell wall, or by introducing strains or areas of weakness in the shell as by surface etching or the presence of inclusions, or in other ways.

The more fragile resinous microcapsules, if previously partially embedded in the polyethylene layer as described in the earlier example, may be adhered to or partially embedded in the heat-softened dried adhesive layer in the same manner as just described, to provide a product which initially possesses the desired free-sliding characteristics but which subsequently loses this property because of the gradual collapse of the protruding portions of the hollow particles.

FIGURE 3 illustrates the application of the adhesive-coated web 20′, corresponding to the web 20 of FIGURE 1 but including the adhesive release layer 30, to a rigid substrate 31 such as a smooth concrete or wood subfloor. The liner is then stripped away in successive small areas and replaced, as shown in FIGURE 4, by the permanent floor surfacing material 32, which may for example be a vinyl floor tile. The tile is slid into the desired position and is then bonded in place by the application of localized pressure sufficient to collapse the microballoons 14. By placing boards or other flat-surfaced walkways or supports over the protective liner at areas not in process, a workman is able to reach all parts of the floor area without affecting the microballoons, which remain as fully effective spacers until purposely collapsed by localized pressure on the flexible vinyl tile. Ceramic tile and other rigid attachments are similarly positioned and adhered in place where the tile area is sufficiently small and the available pressure sufficiently large to provide unit pressure sufficient to collapse the separating hollow particles.

A further application of the principles of the invention is illustrated in FIGURE 5 wherein is shown in cross-section a self-sustaining strip of adhesive 33, preferably a pressure-sensitive adhesive, which has been sparsely coated on both surfaces with partially embedded microballoons 14. The adhesive strip is first positioned in a desired location by sliding into place, and one or more pieces of decorative, protective, or functional sheet material applied thereover and also slid into desired position. Adhesive bonding is then accomplished by application of localized pressure sufficient to collapse the particles. The adhesive strip may be prepared as described hereinbefore, i.e., on a liner, or between two liners, carrying the partially embedded microballoons. Where two liners are employed, it is convenient to employ a polysilicone coating on only one of them, or different coatings on the two, so that they require a differential removal effort.

The same principles may be applied to freshly prepared coatings of temporarily or permanently tacky or self-adherent adhesive materials. As an example, in bonding "Micarta" cured resin sheet material to desk or counter tops, both the substrate and the sheet are coated with a high strength self-bonding adhesive cement which is then dried. The cement as generally used comprises a blend of a synthetic rubbery polymer, a compatible phenolic resin, and an alkaline earth oxide. On contact, the two layers bond together so firmly that they cannot be separated. Thus while the adhesive cement is not properly to be considered a pressure-sensitive adhesive, the action of the two opposed coatings produces what may for the present purposes be considered a fully equivalent result. It will be apparent that the panel must be precisely positioned before the two adhesive surfaces are permitted to come together. It is now found that a sparse coating of fragile microballoons on at least one, or preferably both of the two adhesive surfaces provides a degree of maneuverability sufficient to permit the resinous sheet to be lightly applied, lifted if necessary, and shifted to more exact registry. For such purposes, mere sprinkling of the particles sparsely and uniformly over one or both of the two adhesive surfaces provides fully adequate separation, the particles becoming only slightly embedded but preferentially bonded in the adhesive coating on which applied. Subsequent application of localized pressure collapses the hollow particles and permits the two adhesive surfaces to contact and bond together.

Hollow microspheroids having flexible thin walls, such as the previously mentioned urea-formaldehyde resin or other resinous or polymeric spheroidal shells or microballoons, collapse under pressure by what appears to be an inward folding of the flexible membrane, whereas the more brittle glass-walled spheroids fracture or disintegrate to a powder. The latter is true also of the brittle microspheroids prepared from alkali silicates or the like, e.g., by the methods described in Veatch et al. U.S. Patent No. 3,030,215. With the brittle particles it is found particularly desirable to embed the particles for a significant portion of their diameter in the adhesive layer, the fragments produced on bursting of the shell then apparently remaining within the embedded portion and thus being prevented from spreading over and masking the adjacent adhesive surface.

The application of the microballoons to the plastic liner is conveniently accomplished with an aspirator as described in connection with FIGURE 1, but the method is not limited thereto. A particularly desirable method involves passing the liner around a revolving drum dipping into a supply of the spheres in a trough. The temperature of the liner is controlled by controlling the temperature of the hollow drum, e.g., by introduction of steam. The web is then passed over a second heated drum, e.g., at a temperature of about 270° F., to permit softening of the polymeric coating and embedding of the particles. With the first drum at 70° F. a desirable randomly uniform sparse coating of microballoons is obtained. At higher temperatures a heavier coating is achieved, essentially complete coverage resulting at about 200° F.

The concentration of microcapsules may vary considerably from that of the examples, depending in part on their size and on the particular adhesive and other components of the structure. More rigid films or covering materials require fewer points of separation. Larger numbers of small-diameter capsules are required per unit area than of larger particles. Softer adhesives require larger capsules. In general, the use of sufficient of the microballoons to cover about one-tenth to about one-third of the adhesive area is preferred.

Commercially available small thin-walled hollow fragile particles or microballoons are generally found to be mixed with rather high proportions of solid particles or fragments, which are ineffective as spacing media and merely reduce the available adhesion value when applied to the adhesive surface. The hollow particles may be separated by flotation, for example on water, but complete separation is difficult due to occlusion of the fragments on the spheres. Fortunately, further separation is found to occur at the polyethylene-adhesive interface in the process described in connection with FIGURES 1 and 2. Whereas the hollow spheres are embedded to only about one-fourth to one-third of their diameters, the solid fragments become substantially completely embedded in the polyethylene and accordingly do not transfer to the adhesive surface on removal of the liner. The surface of the adhesive between the microballoons therefore remains clean and tacky.

Although unicellular spheroids are most effective for the purposes of the invention and are preferred, useful results may also be obtained with multi-cellular microballoon particles of various shapes. Like the spheroids, the particles must be sufficiently fragile to collapse under the pressures available while still being sufficiently strong to suspend the covering, at least under its own weight, during positioning.

The particular pressure-sensitive adhesive hereinbefore described as an acrylate-acrylic acid copolymer has the advantageous property of showing an increase in adhesion to metal surfaces on continued contact therewith. As a result, the slight loss in adhesion first encountered in the presence of the microballoons is soon more than recovered as the adhesive-to-metal bond is strengthened; and a strong and essentially permanent bond is eventually achieved. Surprisingly, a similar although less drastic increase in adhesion is obtained with other less chemically active rubber-resin type pressure-sensitive adhesives on continued contact, particularly at moderately elevated temperatures or pressures, the value soon approaching that attainable with the same adhesive in the complete absence of intervening adhesion-masking materials. Although the reason for this action has not been fully determined, it is believed that the collapsed or shattered remnants of the microballoons gradually become physically intermixed with, or embedded in, the relatively soft and extensible adhesive mass, the latter displacing such remnants from contact with the substrate surface.

Some variation in microballoon diameter is permitted as has hereinbefore been indicated. Best results are achieved with rather closely graded products in the range of diameters from about 40 to about 100 microns, but very small spheres are more difficult to handle and the larger spheres cause excessive surface irregularity of the adhesive coating. Cuts of about 40–70 or about 70–100 micron average diameter microspheres have been found equally desirable.

Variations in the thickness of the adhesive layer have been shown to have an influence on the effectiveness of the microballoons in preventing adhesive-to-substrate contact. Larger spheres in general require thicker adhesive layers. Excessive adhesive thickness is economically undesirable and may permit eventual shifting or misalignment of the adherently bonded covering. Insufficient adhesive lessens the strength of the adhesive bond both as initially obtained and as attained after prolonged contact.

What is claimed is as follows:

1. The method of providing for non-adherent contact between an adhesive-receptive substrate surface and a covering having a pressure-sensitive adhesive surface layer, comprising randomly uniformly sparsely distributing over and partially embedding in said adhesive surface layer a quantity of thin-walled fragile microballoons which are collapsible under hand pressure.

2. In the method of making an adherently attachable surface-covering sheet material, the steps comprising randomly uniformly sparsely distributing over the surface of a plastic supporting stratum a quantity of thin-walled fragile microballoons which are collapsible under hand pressure, partially embedding said microballoons in said plastic stratum, and providing thereover a layer of pressure-sensitive adhesive surrounding the exposed portions of said microballoons and in releasable adherent contact with the areas of said plastic surface surrounding said microballoons.

3. The method of making a flexible protective and decorative adhesive sheet material capable of being slid into desired position on a receptive substrate surface and of then being adherently bonded thereto by pressure, comprising: randomly uniformly sparsely distributing a quantity of thin-walled fragile microballoons, which are collapsible under hand pressure, over a liner sheet having a thermoplastic polymeric surface layer; uniformly partially releasably embedding said microballoons in said polymeric layer; applying thereover a layer of normally tacky and pressure-sensitive adhesive, said adhesive surrounding the exposed portions of said microballoons and making releasable adhesive contact with the surface of said polymeric layer surrounding said microballoons; and adherently bonding to the surface of said adhesive layer opposite said polymeric layer a flexible protective and decorative sheet material.

4. A pressure-sensitive adhesive sheet material capable in protected extended-length strip form of being tightly wound in convolute roll form and on unwinding therefrom and removing the protective liner of being placed in contact with a substrate having an adhesive-receptive surface and of being slid into desired registry on said surface without adhesive bonding, and of then readily being firmly adherently bonded thereto by simple application of pressure, said sheet material comprising: an outer flexible protective and decorative sheet material, a layer of pressure-sensitive adhesive bonded thereto and having an opposite surface layer, and a quantity of thin-walled fragile microballoons, collapsible under hand pressure, randomly uniformly sparsely distributed over and partially embedded within said surface layer; and a removable protective liner over said surface layer, including a plastic surface layer formed with surface depressions closely matching the surfaces of the microballoons extending beyond the adhesive surface.

5. A protected pressure-sensitive adhesive sheet material comprising a layer of pressure-sensitive adhesive, a quantity of thin-walled fragile microballoons, collapsible under hand pressure, randomly uniformly sparsely distributed over and partially embedded within said layer, and a supporting and protecting removable liner including a plastic surface layer in contact with said adhesive layer and formed with surface depressions closely matching the extending surfaces of said microballoons.

6. A pressure-sensitive adhesive sheet material comprising a thin layer of pressure-sensitive adhesive having an exposed surface layer and, randomly uniformly sparsely distributed over and partially embedded in said surface layer, a quantity of thin-walled fragile microballoons which are collapsible under hand pressure.

7. A pressure-sensitive adhesive self-sustaining film having randomly uniformly sparsely distributed over and partially embedded in each surface layer thereof a quantity of thin walled fragile microballoons which are collapsible under hand pressure.

8. The sheet material of claim 6 in which the microballoon shell is an amino-aldehyde resin.

9. The sheet material of claim 6 in which the microballoon shell is a siliceous film.

10. The sheet material of claim 6 in which the microballoon shell is a fused glass.

11. Sheet material useful as a supporting liner in the preparation of a protected pressure-sensitive adhesive layer and comprising a flexible supporting web including a continuous thermoplastic surface stratum having an adhesive release surface characteristic, and a quantity of exposed thin-walled fragile microballoons, collapsible under hand pressure, randomly uniformly distributed over and removably partially embedded within said stratum.

12. An article having a surface and, bonded to said surface, a thin layer of pressure-sensitive adhesive having an exposed surface layer, and randomly uniformly sparsely distributed over and partially embedded in said surface layer, a quantity of thin-walled fragile microballoons which are collapsible under hand pressure.

13. A protected pressure-sensitive adhesive sheet material, said sheet material being capable of being slid into desired position on an adhesive-receptive surface and of then being firmly adherently pressure-bonded to said surface, and comprising a backing, a layer of pressure-sensitive adhesive, and, randomly uniformly sparsely distributed over the adhesive layer, a large number of small protrusions having a non-adhesive exposed surface and which are collapsible under hand pressure; and said sheet material being provided with a removable protective liner, said liner covering, and accurately conforming to, the surface contour of said protrusions and the adhesive surface therebetween.

14. A pressure-sensitive adhesive sheet material capable of being slidably positioned on an adhesive-receptive surface and of then being adhesively attached to said surface by application of pressure, and comprising a backing, a layer of pressure-sensitive adhesive, and, uniformly randomly sparsely distributed over the adhesive layer, small protrusions collapsible under hand pressure, having a non-adhesive exposed surface, and in sufficient number and of adequate dimensions to maintain the intervening exposed adhesive surfaces out of contact with said adhesive-receptive surface when the sheet material is laid thereon and prior to said application of pressure.

References Cited
UNITED STATES PATENTS

| | | | |
|---|---|---|---|
| 2,383,884 | 8/1945 | Palmquist | 161—406 X |
| 2,403,752 | 7/1946 | Phillippi | 88—82 |
| 2,430,534 | 11/1947 | Rodli | 161—406 X |
| 2,432,928 | 12/1947 | Palmquist | 161—409 |
| 2,592,882 | 4/1952 | Fisher et al. | 88—82 |
| 2,806,509 | 9/1957 | Bozzacco et al. | 161—160 |
| 3,111,584 | 11/1963 | Appeldorn | 161—165 X |
| 3,143,436 | 8/1964 | Dosmann | 117—65.2 |
| 3,172,942 | 3/1965 | Berg | 88—82 |

MORRIS SUSSMAN, *Primary Examiner.*